United States Patent
Wu et al.

(10) Patent No.: US 6,512,704 B1
(45) Date of Patent: Jan. 28, 2003

(54) DATA STROBE RECEIVER

(75) Inventors: Chung-Hsiao R. Wu, Sunnyvale, CA (US); Jyh-Ming Jong, Saratoga, CA (US); Lee A. Warner, Redwood City, CA (US); Jurgen M. Schulz, Pleasanton, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 4 days.

(21) Appl. No.: 09/952,951

(22) Filed: Sep. 14, 2001

(51) Int. Cl.$^7$ .............................................. G11C 16/04
(52) U.S. Cl. .................. 365/189.07; 365/233; 365/193; 365/194
(58) Field of Search ................................ 365/219, 220, 365/221, 189.09, 193, 194, 233, 189.07

(56) References Cited

U.S. PATENT DOCUMENTS

| | | | | |
|---|---|---|---|---|
| 6,064,625 A | * | 5/2000 | Tomita | 365/233 |
| 6,081,477 A | | 6/2000 | Li | 365/233 |
| 6,112,284 A | | 8/2000 | Hayek et al. | 711/167 |
| 6,154,418 A | | 11/2000 | Li | 365/233 |
| 6,215,710 B1 | | 4/2001 | Han et al. | 365/193 |
| 2002/0106037 A1 | * | 8/2002 | Gara | 375/340 |

OTHER PUBLICATIONS

Samsung Electronics, DDR SRAM/SGRAM Application Note, 1998.

* cited by examiner

Primary Examiner—Michael S. Lebentritt
Assistant Examiner—Toan Le
(74) Attorney, Agent, or Firm—Park, Vaughan & Fleming LLP

(57) ABSTRACT

A data strobe receiver that includes a first comparator. The first comparator has a first input that is coupled to a first reference voltage. The first comparator has a second input that is coupled to a data strobe. The first comparator also has an output. The data strobe receiver also includes a delay element. The delay element has an input that is coupled to the output of the first comparator. The delay element also has an enable input and an output. The data strobe receiver also includes a second comparator. The second comparator has a first input that is coupled to a second voltage reference. The second comparator has a second input that is coupled to the data strobe. The second comparator also has an output. The data strobe receiver also includes a flip-flop. The flip-flop has a preset input that is coupled to the output of the second comparator. The flip-flop has a clock input that is coupled to the output of the delay element. The flip-flop also has an output that is coupled to the enable input of the delay element.

28 Claims, 3 Drawing Sheets

DATA STROBE RECEIVER

FIELD OF THE INVENTION

The present invention generally relates to semiconductor devices. More specifically, the present invention relates to data strobe receivers.

BACKGROUND

There has always been a demand for faster, higher capacity random access memory (RAM) devices. At one time, dynamic random access memory (DRAM) was typically used as the main memory in computer systems. Although the operating speed of the DRAM improved over the years, the speed did not reach that of the processors used to access the DRAM. In a computer system, for example, the slow access and cycle times of the DRAM led to system bottlenecks. These bottlenecks slowed down the throughput of the system despite the very fast operating speed of the system's processor.

As a result, a new type of memory known as a synchronous dynamic random access memory (SDRAM) was developed to provide faster operation in a synchronous manner. SDRAMs are designed to operate synchronously with the system clock. That is, the input and output data of the SDRAM are synchronized to an active edge of the system clock.

Although SDRAMs have overcome some of the timing disadvantages of other memory devices, such as DRAMs, there is still a need for faster memory devices. Double data rate (DDR) SDRAMs provide twice the operating speed of the conventional SDRAM. These devices allow data transfers on both the rising and falling edges of the system clock and thus provide twice as much data as the conventional SDRAM. DDR SDRAMs are also capable of providing burst data at a high-speed data rate.

Due to the high-speed data transfers, DDR SDRAMs use a bi-directional data strobe (DQS) to register the data being input or output on both edges of the system clock. Industry standards define several states of DQS before, during, and after a burst transfer of data. Before a burst transfer of data, DQS is in a high-impedance state that is known as Hi-Z. When DQS is in Hi-Z, DQS is at a voltage level between logic high and logic low.

One clock cycle before a burst data transfer, DQS transitions from Hi-Z to logic low. This logic low state is known as "data strobe preamble." After the data strobe preamble, DQS transitions (both low-to-high transitions and high-to-low transitions) are utilized to synchronize the transferred data. One half clock before the data transfer is complete, DQS remains in a logic low state. This state is known as "postamble." After the completion of the postamble, DQS enters the Hi-Z state.

A need exists for a simple DQS receiver that can accurately determine DQS transitions while utilizing minimal semiconductor die area.

SUMMARY OF INVENTION

One embodiment of the invention is a data strobe receiver that includes a first comparator. The first comparator has a first input that is coupled to a first reference voltage. The first comparator has a second input that is coupled to a data strobe. The first comparator also has an output. The data strobe receiver also includes a delay element. The delay element has an input that is coupled to the output of the first comparator. The delay element also has an enable input and an output. The data strobe receiver also includes a second comparator. The second comparator has a first input that is coupled to a second voltage reference. The second comparator has a second input that is coupled to the data strobe. The second comparator also has an output. The data strobe receiver also includes a flip-flop. The flip-flop has a preset input that is coupled to the output of the second comparator. The flip-flop has a clock input that is coupled to the output of the delay element. The flip-flop also has an output that is coupled to the enable input of the delay element.

Another embodiment of the invention is another data strobe receiver. This data strobe receiver includes a comparator. The comparator has a first input that is coupled to a data strobe. The comparator has a second input that is coupled to an inverted data strobe. The comparator also has an output. The data strobe receiver also includes a delay element. The delay element has an input that is coupled to the output of the comparator. The delay element also has an enable input and an output. The data strobe receiver also includes a threshold comparator. The threshold comparator has a first input that is coupled to the data strobe. The threshold comparator has a second input that is coupled to the inverted data strobe. The threshold comparator also has an output. The data strobe receiver also includes a flip-flop. The flip-flop has a preset input that is coupled to the output of the threshold comparator. The flip-flop has a clock input that is coupled to the output of the delay element. The flip-flop has an output that is coupled to the enable input of the delay element.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data Strobe Data Receiver for Single-Ended Data Strobes

Figure 1:
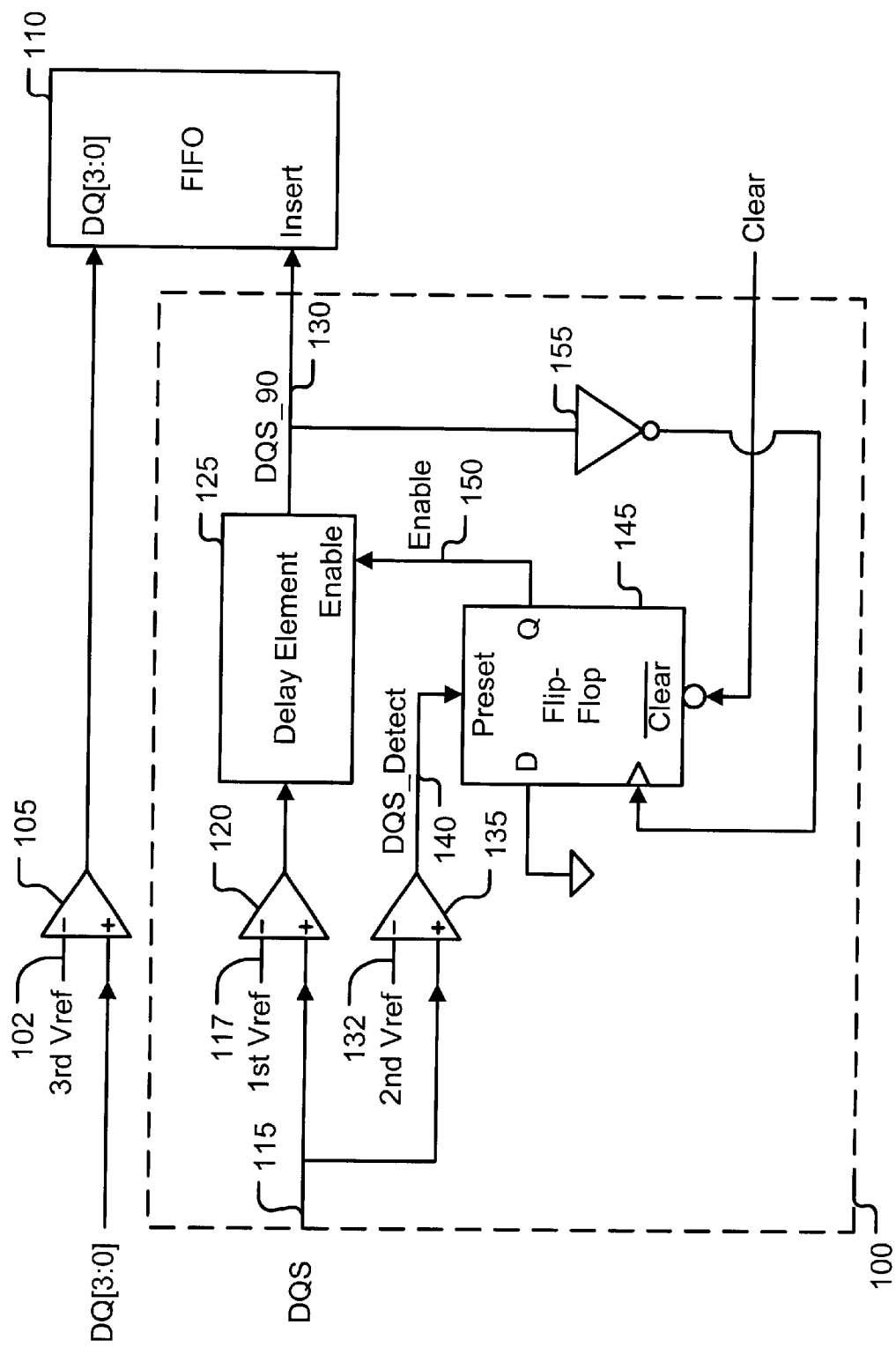
FIG. 1 presents a data strobe receiver.

FIG. 1 presents a data strobe (DQS) receiver 100 that accurately determines DQS transitions and that utilizes minimal semiconductor die space.

As shown in FIG. 1, the DQS receiver 100 includes a first comparator 120. One input of the first comparator 120 is coupled to a first voltage reference 117. For example, the first input of the first comparator 120 could be coupled to a 1.25 volt or a 1.5 volt reference. The second input of the first comparator 120 is coupled to DQS 115.

As shown in FIG. 1, the output of the first comparator 120 is coupled to a delay element 125. In some embodiments of the invention, the delay element 125 is operable to delay the output of the first comparator 120 by approximately 90 degrees. In other embodiments of the invention, the delay element 125 is operable to delay the output by greater than 45 degrees, less than 135 degrees, or between 45 degrees and 135 degrees. In still other embodiments, the delay of the delay element 125 is programmable during or after assembly of the DQS receiver 100. As shown in FIG. 1, the delay element 125 also includes an enable input 150 and an output, which will be referred to as DQS_90 130. The coupling of the enable input and the output will be discussed further below.

Referring again to FIG. 1, the DQS receiver 100 also includes a second comparator 135. One input of the second comparator 135 is coupled to a second voltage reference 132. In some embodiments of the invention, the second voltage reference 132 has a different voltage potential than the first voltage reference 117. For example, the second voltage reference 132 may have a voltage potential that is 75 millivolts, 100 millivolts, 125 millivolts, 150 millivolts, 175 millivolts, or 200 millivolts higher or lower than the first voltage reference 117. In some embodiments of the invention, the voltage difference between the first voltage reference 117 and the second voltage reference 132 can be programmed during or after fabrication of the DQS receiver 100. The second comparator 135 also has an output, which will be referred to as DQS_Detect 140 and which will be further discussed in the following paragraph.

Referring again to FIG. 1, the DQS receiver 100 also includes a flip-flop 145. The flip-flop 145 has a preset input that is coupled to DQS_Detect 140. In addition, the flip-flop 145 has a clock input that is coupled to the inverted DQS_90 130 via inverter 155. In other embodiments of the invention (not shown) the clock input could be an active low clock input that could be coupled to DQS_90 130 directly. The flip-flop 145 also has an output that is coupled to the enable input 150 of the delay element 125. The output of the flip-flop will be referred to as Enable 150. As shown in FIG. 1, the flip-flop 145 also includes a data input that is coupled to ground and an active-low reset input.

Referring again to FIG. 1, the DQS receiver 100 is coupled to a first-in-first-out buffer (FIFO) 110. Specifically, DQS_90 130 is coupled to an insert input of FIFO 110. The FIFO 110 also includes a data (DQ) input, which is coupled to the output of a third comparator 105. One input of the third comparator 105 is coupled to a voltage source 102. The second input of the third comparator 105 is coupled to a DQ input.

Figure 2:
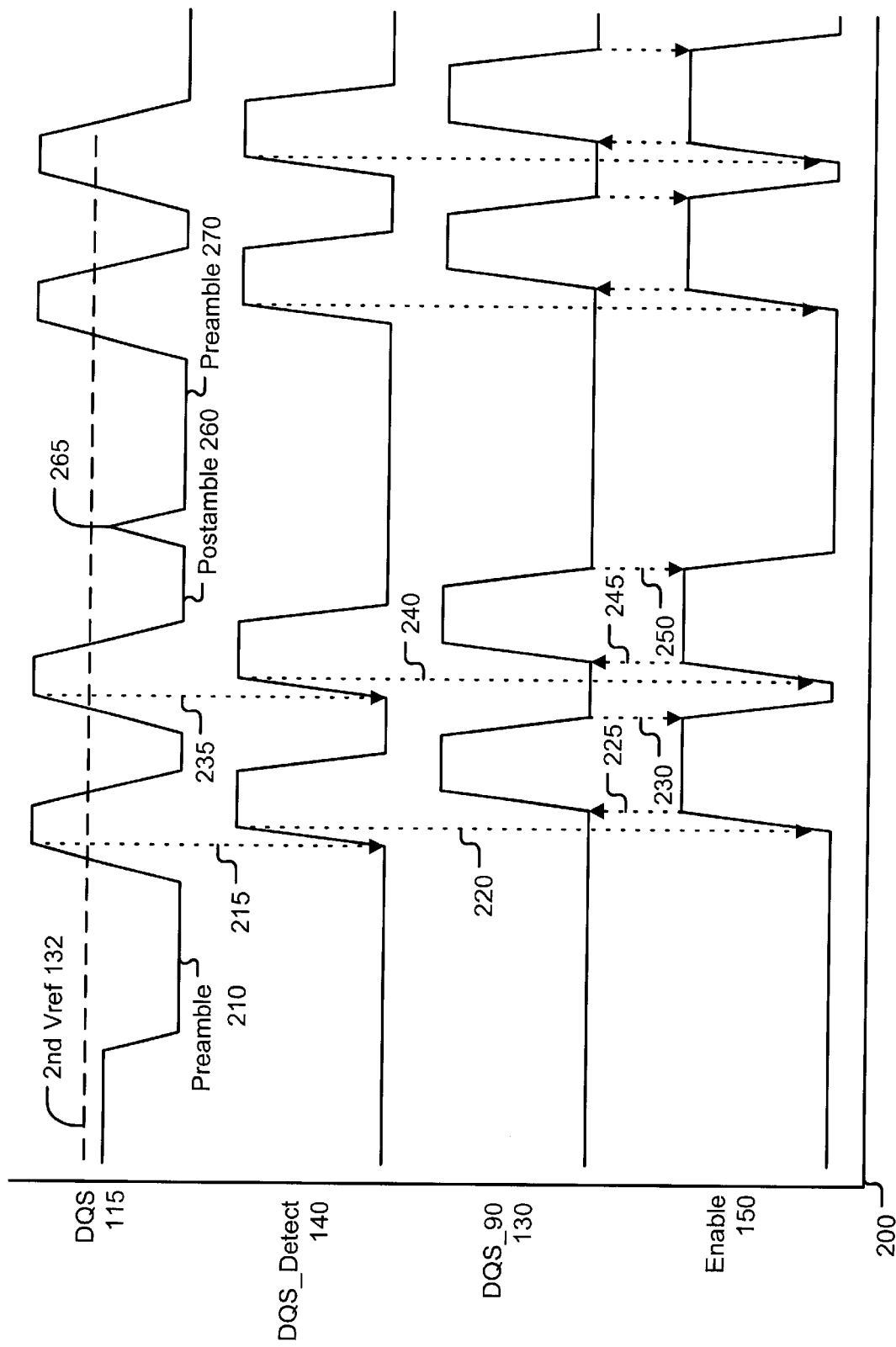
FIG. 2 presents a timing diagram.

Method of Operating a Data Strobe Data Receiver for Single-Ended Data Strobes One method of operating DQS receiver 100 is shown in timing diagram 200, which is presented in FIG. 2.

Referring to timing diagram 200, DQS 115 is initially in a Hi-Z state. Thus, the DDR memory is idle. When DQS 115 is in the Hi-Z state, the voltage level of DQS 115 is less than the second voltage reference 132. Thus, the second comparator 135 will not detect the Hi-Z state and the output of the second comparator 135, DQS_Detect 140, is low. In its initial state, Enable 150 is also low. (The initial state of Enable 150 can be set by applying a reset signal to flip-flop 145.) Because Enable 150 is low, the delay element 125 is not enabled and DQS_90 130 is held low regardless of the state of the signal entering the delay element 125.

Next, DQS 115 enters data strobe preamble state 210. Thus, a burst data transfer will be forthcoming in one cycle. After the conclusion of the data strobe preamble state 210, DQS 115 transitions from low to high. At time 215, the second comparator 135 detects the transition and DQS_Detect 140 begins to transition from low to high. After DQS_Detect 140 transitions from low to high, at time 220, Enable 150 begins to transition from low to high. When Enable 150 is high, the delay element 125 begins to pass signals, and at time 225, DQS_90 130 begins to transition from low to high. This transition can be utilized to strobe the FIFO 110 to sample and store a first byte of data.

Enable 150 remains high until DQS_90 130 transitions from high to low. When DQS_90 130 completes such a transition at time 230, the flip-flop 145 is clocked and hence Enable 150 transitions from high to low. In addition, the high to low transition of DQS_90 130 can be utilized to strobe the FIFO 110 to sample and store a second byte of data.

When DQS 115 transitions from low to high at time 235, DQS_Detect 140 again transitions from low to high. At the completion of the transition, at time 240, Enable 150 transitions from low to high, and the delay element 125 begins to pass signals and at time 245, DQS_90 130 transitions from low to high. Thus, FIFO 110 can utilize this transition to sample and store a third byte of data. After this transition, at time 250, the transition from high to low of DQS_90 130 causes Enable 150 to transition from high to low. In addition, DQS_90's 130 transition can be utilized by the FIFO 110 to sample and store a fourth byte of data.

Referring again to FIG. 2, after DQS 115 completes postamble state 260, the DQS enters a short Hi-Z state 265 before DQS 115 transitions low to enter a second preamble state 270. However, the second comparator 135 does not detect Hi-Z state because DQS 115 does not exceed the second voltage reference 132. As a result, DQS_Detect 140 remains low.

As shown in FIG. 2, DQS receiver 100 accurately detects high to low and low to high transitions of DQS 115 while ignoring transitions that occur when DQS 115 enters and exits Hi-Z states. DQS receiver 100 utilizes a signal path that includes the first comparator 120 and the delay element 125 to accurately strobe the FIFO 110 to sample and store data. In addition, the DQS receiver 100 utilizes a distinct control path that includes the second comparator 135 and flip-flop 145 to ignore Hi-Z transitions.

Data Strobe Data Receiver for Differential Data Strobes

Figure 3:
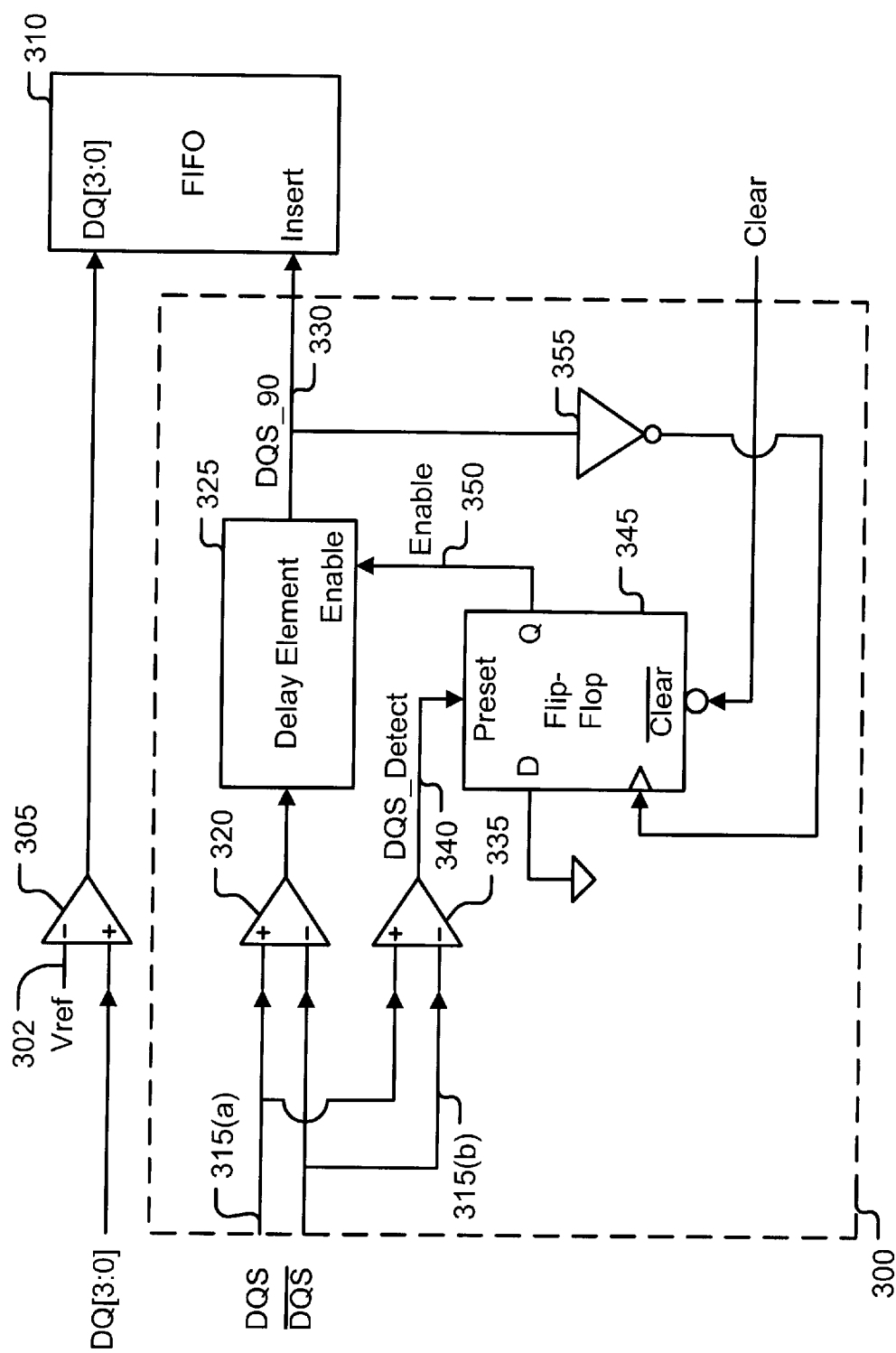
FIG. 3 presents another data strobe receiver.

FIG. 3 presents a DQS receiver 300 for receiving differential data strobe signals such as 315(a–b). Such signals are utilized in DDR2 memory systems. DQS receiver 300 is similar to DQS receiver 100 with the exceptions as discussed below.

Referring to FIG. 3, DQS receiver 300 includes a comparator 320. The comparator 320 is similar to first comparator 120. However, the first input of the comparator 320 receives DQS 315(a) while the second input receives inverted DQS 315(b).

DQS receiver 300 also includes a threshold comparator. The first input of the threshold comparator 335 receives DQS 315(a) while the second input receives inverted DQS 315(b). The threshold comparator's output, DQS_Detect 340, is high only if DQS 315(a) exceeds inverted DQS 315(b) by a given voltage potential. For example, DQS_Detect 340 may be high only if DQS 315(a) exceeds inverted DQS 315(b) by 75 millivolts, 100 millivolts, 125 millivolts, 150 millivolts, 175 millivolts, or 200 millivolts. In some embodiments of the invention, the threshold can be programmed during or after fabrication of the DQS receiver 300.

CONCLUSION

The foregoing descriptions of embodiments of the present invention have been presented for purposes of illustration and description only. They are not intended to be exhaustive or to limit the present invention to the forms disclosed.

Accordingly, many modifications and variations will be apparent to practitioners skilled in the art. Additionally, the above disclosure is not intended to limit the present invention. The scope of the present invention is defined by the appended claims.

It is claimed:

1. A data strobe receiver comprising:
   a) a first comparator, the first comparator having a first input that is coupled to a first reference voltage, the first comparator having a second input that is coupled to a data strobe, the first comparator having an output;
   b) a delay element, the delay element having an input that is coupled to the output of the first comparator, the delay element having an enable input, the delay element having an output;
   c) a second comparator, the second comparator having a first input that is coupled to a second voltage reference, the second comparator having a second input that is coupled to the data strobe, the second comparator having an output; and
   d) a flip-flop, the flip-flop having a preset input that is coupled to the output of the second comparator, the flip-flop having a clock input that is coupled to the output of the delay element, the flip-flop having an output that is coupled to the enable input of the delay element.

2. The data strobe receiver of claim 1, wherein the flip-flop has a data input that is coupled to ground.

3. The data strobe receiver of claim 1, wherein the flip-flop has a reset input that is operable to receive a reset signal.

4. The data strobe receiver of claim 1, wherein the clock input is active low.

5. The data strobe receiver of claim 1, wherein the clock input is coupled to the output of the delay element via an inverter.

6. The data strobe receiver of claim 1, further comprising:
   e) a third comparator, the third comparator having a first input that is coupled to the first voltage reference, the third comparator having a second input that is operable to receive data, the third comparator having an output; and
   f) a first-in-first-out buffer, the first-in-first-out-buffer having a data input that is coupled to the output of the third comparator, the first-in-first-out-buffer having a strobe input that is coupled to the output of the delay element.

7. The data strobe receiver of claim 1, wherein the delay element delays the output of the first comparator by greater than 45 degrees.

8. The data strobe receiver of claim 1, wherein the delay element delays the output of the first comparator by less than 135 degrees.

9. The data strobe receiver of claim 1, wherein the delay element delays the output of the first comparator by greater than 45 degrees and less than 135 degrees.

10. The data strobe receiver of claim 1, wherein the delay of the delay element is programmable.

11. The data strobe receiver of claim 1, wherein the second voltage reference has a voltage potential that is over 100 millivolts greater than the voltage potential of the first voltage reference.

12. The data strobe receiver of claim 1, wherein the second voltage reference has a voltage potential that is over 125 millivolts greater than the voltage potential of the first voltage reference.

13. The data strobe receiver of claim 1, wherein the second voltage reference has a voltage potential that is within 175 millivolts of the voltage potential of the first voltage reference.

14. The data strobe receiver of claim 1, wherein the voltage potential of the second voltage can be programmed with respect to the voltage potential of the first voltage reference.

15. A data strobe receiver comprising:
   a) a comparator, the comparator having a first input that is coupled to a data strobe, the comparator having a second input that is coupled to an inverted data strobe, the comparator having an output;
   b) a delay element, the delay element having an input that is coupled to the output of the comparator, the delay element having an enable input, the delay element having an output;
   c) a threshold comparator, the threshold comparator having a first input that is coupled to the data strobe, the threshold comparator having a second input that is coupled to the inverted data strobe, the threshold comparator having an output; and
   d) a flip-flop, the flip-flop having a preset input that is coupled to the output of the threshold comparator, the flip-flop having a clock input that is coupled to the output of the delay element, the flip-flop having an output that is coupled to the enable input of the delay element.

16. The data strobe receiver of claim 15, wherein the flip-flop has a data input that is coupled to ground.

17. The data strobe receiver of claim 15, wherein the flip-flop has a reset input that is operable to receive a reset signal.

18. The data strobe receiver of claim 15, wherein the clock input is active low.

19. The data strobe receiver of claim 15, wherein the clock input is coupled to the output of the delay element via an inverter.

20. The data strobe receiver of claim 15, further comprising:
   e) a second comparator, the second comparator having a first input that is coupled to a voltage reference, the second comparator having a second input that is operable to receive data, the second comparator having an output; and
   f) a first-in-first-out buffer, the first-in-first-out-buffer having a data input that is coupled to the output of the second comparator, the first-in-first-out-buffer having a strobe input that is coupled to the output of the delay element.

21. The data strobe receiver of claim 15, wherein the delay element delays the output of the comparator by greater than 45 degrees.

22. The data strobe receiver of claim 15, wherein the delay element delays the output of the comparator by less than 135 degrees.

23. The data strobe receiver of claim 15, wherein the delay element delays the output of the comparator by greater than 45 degrees and less than 135 degrees.

24. The data strobe receiver of claim 15, wherein the delay of the delay element is programmable.

25. The data strobe receiver of claim 15, wherein the threshold of the threshold comparator is over 100 millivolts.

26. The data strobe receiver of claim 15, wherein the threshold of the threshold comparator is over 125 millivolts.

27. The data strobe receiver of claim 15, wherein the threshold of the threshold comparator is less than 175 millivolts.

28. The data strobe receiver of claim 15, wherein the threshold of the threshold comparator is programmable.

* * * * *